United States Patent Office 3,471,855
Patented Oct. 7, 1969

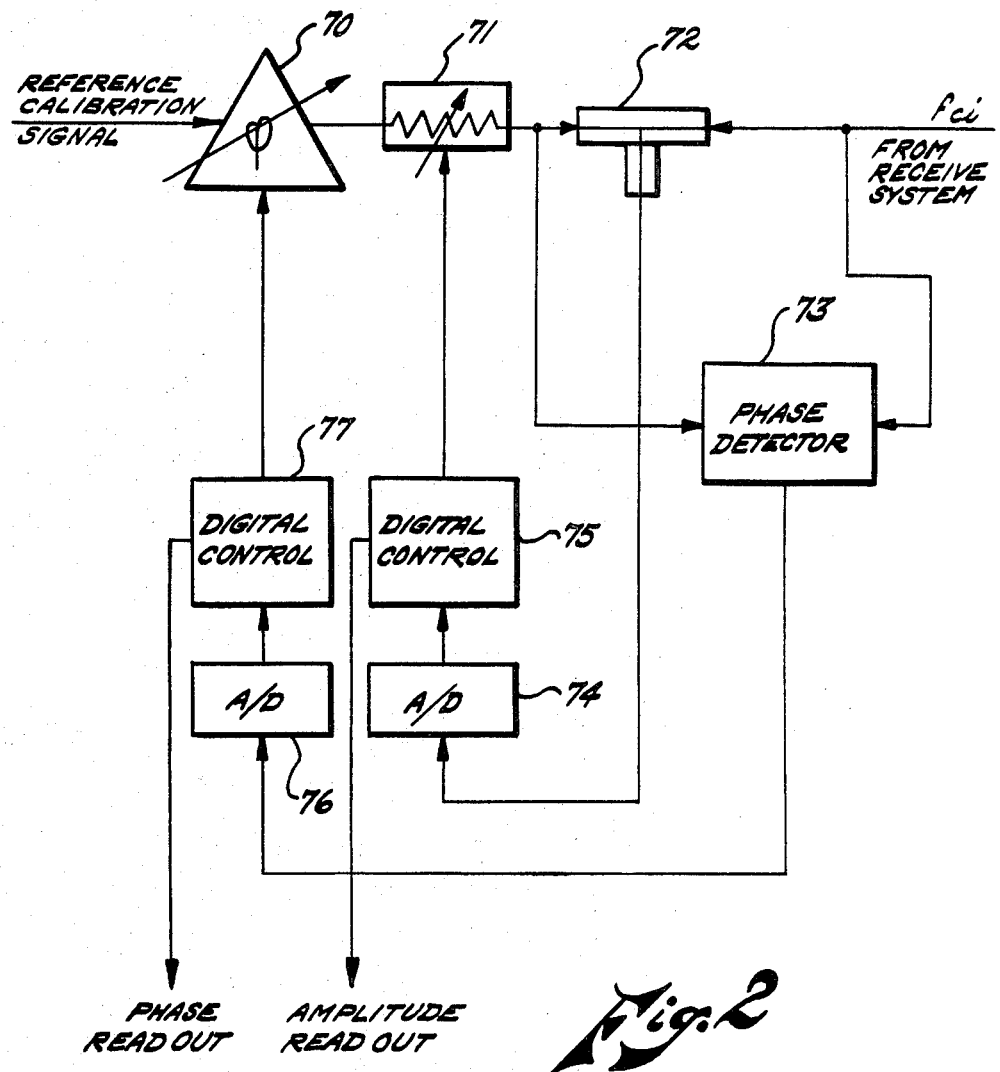

3,471,855
SYSTEM FOR GENERATING TEST SIGNALS FOR AN ARRAY OF RECEIVER CHANNELS
Richard T. Thompson, Norristown, Pa., assignor to the United States of America as represented by the Secretary of the Air Force
Filed Nov. 25, 1968, Ser. No. 778,462
Int. Cl. G01s 7/40
U.S. Cl. 343—17.7                               4 Claims

ABSTRACT OF THE DISCLOSURE

A system of generating coherent calibration test signals for an array of receiver channels to measure continuously the gain and phase stability of each of the channels over their operating frequency range.

Background of the invention

This invention relates to a testing and measuring system and in particular to a system for testing and calibrating a multi-channel receiver.

Many radar and communication systems require simultaneous operation of an array of receiver channels which may require a high degree of coherence between the signals they process or may be completely independent. Consider the case of a group of receiver channels each of which has a relatively narrow band frequency response $H_i(f)$ whose center frequency, $F_i$, can be positioned anywhere within an operating band $(f_L - f_u)$. It is desired to have some means to continuously measure the absolute voltage gain between the receiver channels and monitor their sensitivity to weak signals (i.e., measure their minimum discernible signal level). The present invention, in accordance with the aforementioned requirements, provides a system for measuring the performance of a multi-channel receiver.

Summary of the invention

The system of the present invention provides a set of precision calibration signals for an array of receiver channels for the purpose of continuously measuring the gain and phase stability of each of the channels over their operating frequency band. The output calibrating signals from each of the receiver channels are compared with a stable reference signal to produce two output error signals. These error signals are linearly related to the phase and amplitude difference between the reference and receiver channel signals and therefore, the gain and relative phase of the receiver channels.

In addition to measuring the gain and phase of each of the channels, these calibration signals can be used as reference in the signal and data processing following the receiver channels. For instance, they can be used to measure the processing gain, or act as frequency references in Doppler processing.

An object of the present invention is to provide a system for continuously measuring the gain and phase stability of each channel of a multi-channel receiver.

Another object of the present invention is to provide a system for generation of coherent calibration test signals for an array of receiver channels.

Yet another object of the present invention is to provide a system for continuously measuring the absolute voltage gain and the phase coherence between the receiver channels of a multi-channel receiver.

Still another object of the present invention is to provide a system for continuously monitoring the receiver channels of a multi-channel receiver to determine their sensitivity to weak signals.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Description of the drawings

FIGURE 2 illustrates a block diagram for performing amplitude and phase comparison to be utilized in FIGURE 1.

Description of the preferred embodiments

Figure 1:
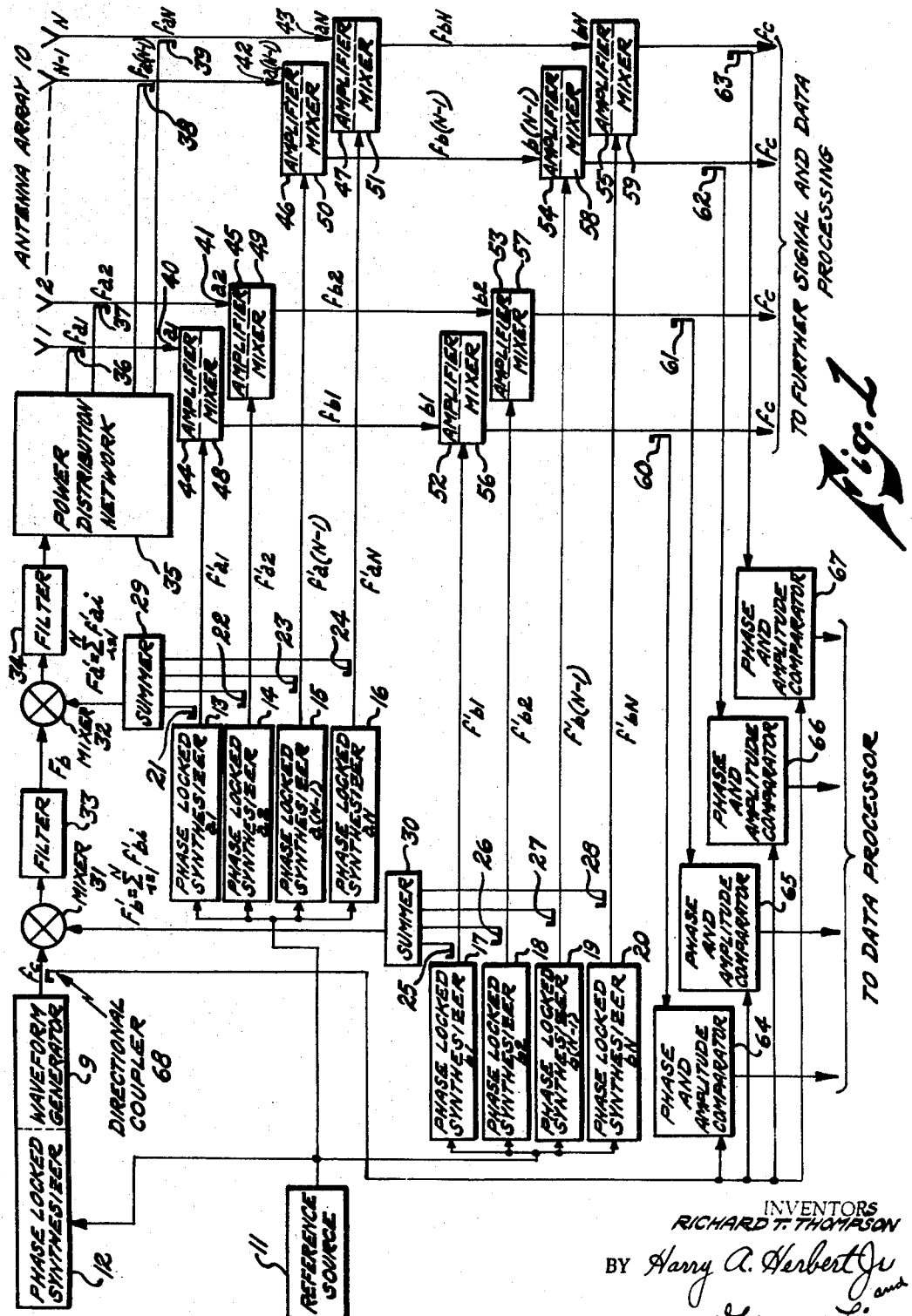
FIGURE 1 shows a block diagram of a preferred embodiment of the invention for amplitude and phase monitoring.

Now referring in detail to FIGURE 1, N signals are being received using an array of N antennas (or elements of an antenna array) and N receiver channels. The antennas 1, 2, N-1 and N are indicated as included in antenna array 10. These N signals could be completely independent of one another and (as shown) be independently processed. In this receiver system all oscillators are phase locked to stable reference source 11, but have the capability of being tuned over a given band of frequencies depending on the system requirements. The aforementioned oscillators are indicated in FIGURE 1 by phase locked synthesizers (PLS) 12–20. It is noted that reference source 11 is needed only if phase coherence is required throughout the receive system. A single calibrating source is shown as calibration waveform function generator 9 which receives an input signal from phase locked synthesizer 12. The output from calibrating waveform function generator 9 has a waveform $f_c(t)$, whose center frequency is $f_c$. Thus, $f_c(t)$ represents a signal which is modulated to fulfill the requirements of the particular application. This calibrating signal is multiplied by each of the local oscillator sources (as represented by phase locked synthesizers) in the receive system to heterodyne $f_c(t)$ to the center frequency of the received signal $f_{ai}(t)$. Thus, a set of N signals, one for each of the receiver channels, is formed. This is accomplished by sampling each of the local oscillator outputs from phase-locked synthesizers 13–20 using directional couplers 21–28, respectively. Then these signals from directional couplers 21–24 are summed in adder 29, and the signals from directional couplers 25–28 in adder 30. The summed signal from adder 29 is applied thereafter to mixer 32 with the summed signal from adder 30 being applied to mixer 31. Simultaneously mixer 31 receives a second input from waveform generator 9 and mixer 32 receives a second input from mixer 31 by way of bandpass filter 33. The output of mixer 32 is also bandpass filtered by filter 34. The filtering eliminates the unwanted signals that result from this nonlinear process.

The local oscillators have been separated into subgroups before summing and mixing with the calibration signal. This permits the frequency band occupied by each of the subgroups to be chosen so as to avoid undesirable cross products which fall into the pass band of the output filter. FIGURE 1 shows two such subgroups for illustration purposes. The exact number would depend on the complexity of the receive system and mixer characteristics.

After the N calibrating signals have been formed, they are distributed from filter 34 to inputs 40–43 of the N receiver channels using phase and amplitude stable power distribution network 35 and directional couplers 36–39, respectively. Directional couplers 36–39 provide the function of summing the antenna and calibrating signals and prevent antenna signals from one channel feeding back into another receiver channel. Receiver amplifier 44–47 precede mixers 48–51 respectively. Phase locked synthesizers 13–16 also feed signals to mixers 48–51, respectively.

Hereinafter follows a description of a typical channel; all other channels operate similarly. The receiver amplifier 44 which precedes the first mixer 48 has a band response which accepts only the calibrating signal $f_{a1}(t)$ which corresponds to that channel (i.e., it attenuates all other calibrating signals $f_{a1}(t)$ below a tolerable level). The input calibrating signal $f_{a1}(t)$ is then multiplied by the mixer with corresponding first level oscillator signal $f'_{a1}$ to produce an output frequency $f_{b1}(t)$ from the first level amplifier 44/mixer 48 unit also shown as unit $a1$. The subscript "$a1$" refers to the processing level and channel number respectively. The first level oscillator is shown as phase locked synthesizer 13.

The signals from mixers 48–51 are fed to amplifiers 52–55 and then to mixers 56–59, respectively. Mixers 56–59 simultaneously receive signals from phase locked synthesizers 17–20, respectively. Again, hereinafter follows a description for a single channel; other channels operate similarly. Thus, the signal $f_{b1}(t)$ from mixer 48 is multiplied with $f'_{b1}$ to produce $f_c(t)$.

These N output signals from the receive channels are compared in amplitude and phase with the reference calibrating signal by utilizing directional couplers 60–63 to feed the output signals to phase and amplitude comparison circuits 64–67, respectively. Phase and amplitude comparison circuits simultaneously receive the reference calibrating signal by way of directional coupler 68. The output signals from phase and amplitude comparison circuits 64–67 may be directed to a data processor. The outputs from mixers 56–59 may be directed to further signal and data processing. Thus, two error signals are obtained from each channel which are directly related to the variation in phase and amplitude in the corresponding channel. In addition, these calibrating signals will act as references in the signal and data processing that follows the receiver. For instance, to monitor signal integration gain or act as frequency and amplitude reference in Doppler processing.

There are several phase and amplitude comparison techniques available for the phase and amplitude comparison circuits. One of these is to apply the receiver output calibration signal and reference calibration signal to a synchronous detector to obtain the I (in-phase) and Q (quadrature) output signals from which phase and amplitude information can be obtained. Another technique is to adjust the phase and amplitude of the reference calibration signal so that a null is obtained using a subtraction circuit such as a magic tee in conjunction with a phase detector as shown in FIGURE 2. Variable precision digital phase shifter 70 and variable precision digital attenuator 71 are controlled by a feedback circuit in a sequential manner. That is, the phase is adjusted for a null keeping the amplitude of the reference signal fixed. The amplitude is then adjusted for a minimum output from the difference port on the magic tee 72. Digital readouts are made on the phase shifter and attenuator settings. Now for a further detailed description, the reference calibration signal $f_c$ is received by way of variable digital shifter 70 in series with variable digital attenuator 71. Magic tee 72 simultaneously receives a second input from the receive system which is the receiver output calibration signal $f_{c1}$. Magic tee 72 operates as a subtraction circuit and provides a resultant signal which is fed to analog to digital component 74. The output from analog to digital component 74 is fed to digital control component 75 which is connected to variable precision digital attenuator 71 for variation thereof while simultaneously digital control component 75 provides an amplitude readout signal.

Phase detector 73 simultaneously receives the identical pair of input signals as magic tee 72 and provides a resultant signal which is applied to analog to digital component 76. The output from analog to digital component 76 is fed to digital control component 77 which is connected to variable precision phase shifter 70 for control thereof. Digital control component 77 simultaneously provides a phase readout signal. It is noted that two amplitude and phase comparators have been discussed. However, it is emphasized any conventional component for phase and amplitude comparison may be utilized.

In the case of an antenna array where all elements are coherently summed to produce a single output signal, the individual element channels or subgroups can be monitored at the output by switching off the appropriate combination of local oscillator signals. This can be accomplished by inserting electronic switches in the local oscillator lines or simply gating off the local oscillator.

I claim:

1. A system for measuring continuously the gain and phase stability of each of the receiver channels of a multichannel receiver over their operating frequency range during the reception of signals comprising means to generate an initial calibrating signal having a predetermined waveform and preselected center frequency, first and second groups of local oscillators, each of said local oscillators having a corresponding receiver channel, each of said local oscillators being tuned to a separate preselected frequency, first means to add the outputs of said first group of local oscillators to provide a first sum, first means to multiply said calibrating signal by said first sum, second means to add the outputs of said second group of local oscillators to provide a second sum, second means to multiply the output of said first multiplying means by said second sum for heterodyning to the center frequency of the received signal to form a set of preselected calibrating signals, one for each receiver channel, means to distribute to each input of said receiver channels its associated preselected calibrating signal from said calibrating set, each of said inputs also being fed the received signal, third means to multiply each of said input signals to said receiver channels with the corresponding signal from said second group of local oscillators, and fourth means to multiply the output of each of said third multiplying means with the corresponding signal from said first group of local oscillators to provide output signals from each receiver channel directly related to the variation in phase and amplitude in the corresponding channel.

2. A system as described in claim 1 further including means to compare in phase and amplitude the output from each of said receiver channels to said initial calibrating signal.

3. A system as described in claim 1 further including a common reference source for each of said local oscillators for phase locking thereof.

4. A system as described in claim 3 wherein said means to generate an initial calibrating signal is comprised of a separate local oscillator, and waveform generator in combination with said common reference source also phase locking said local oscillator of said combination.

References Cited

UNITED STATES PATENTS 3,170,156  2/1965  Downs _____ 343—17.7

RODNEY D. BENNETT, Jr., Primary Examiner

T. H. TUBBESING, Assistant Examiner